(12) United States Patent
Schell et al.

(10) Patent No.: US 9,776,319 B2
(45) Date of Patent: Oct. 3, 2017

(54) PORTABLE WORK BENCH

(71) Applicant: Black & Decker Inc., Newark, DE (US)

(72) Inventors: Craig A. Schell, Street, MD (US); Robert S. Gehret, Hampstead, MD (US); Derek T. Tillery, Edgewood, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 14/837,589

(22) Filed: Aug. 27, 2015

(65) Prior Publication Data

US 2016/0136803 A1    May 19, 2016

Related U.S. Application Data

(60) Provisional application No. 62/044,705, filed on Sep. 2, 2014.

(51) Int. Cl.
| | |
|---|---|
| *F16M 11/20* | (2006.01) |
| *B25H 1/00* | (2006.01) |
| *F16M 11/24* | (2006.01) |
| *F16M 11/42* | (2006.01) |

(52) U.S. Cl.
CPC ......... *B25H 1/0042* (2013.01); *F16M 11/242* (2013.01); *F16M 11/42* (2013.01)

(58) Field of Classification Search
CPC ..... B25H 1/0042; F16M 11/242; F16M 11/42
USPC .......................... 248/129, 164, 431, 439, 647
See application file for complete search history.

(56) References Cited

U.S. PATENT DOCUMENTS

| | | | | |
|---|---|---|---|---|
| 4,611,823 | A | * | 9/1986 | Haas ...................... F16M 11/42 108/119 |
| D527,200 | S | * | 8/2006 | Wu ............................... D6/684 |
| 7,926,523 | B2 | | 4/2011 | Williams et al. |
| 8,047,553 | B2 | | 11/2011 | Voong |
| 8,096,519 | B2 | * | 1/2012 | Tam ......................... B25H 1/04 248/128 |
| 8,313,076 | B2 | | 11/2012 | Tam et al. |
| 8,602,378 | B2 | | 12/2013 | Tam et al. |
| 9,186,810 | B1 | * | 11/2015 | Chang .................. B25H 1/0042 |
| 2009/0007987 | A1 | | 1/2009 | Thomas et al. |
| 2012/0312140 | A1 | | 12/2012 | Rybka et al. |

* cited by examiner

*Primary Examiner* — Gwendolyn Baxter
(74) *Attorney, Agent, or Firm* — Adan Ayala

(57) ABSTRACT

A work bench may include a body for supporting a power tool, a first leg connected to a first end of the body, a second leg connected to a second end of the body, the first and second legs being pivotally connected, the first and second legs being movable between a first position where the body is in a lowered position and a second position where the body is in an elevated position, and a spring connecting the first and second legs. The spring provides at least a portion of the force necessary to move the first and second legs from the first position to the second position.

6 Claims, 9 Drawing Sheets

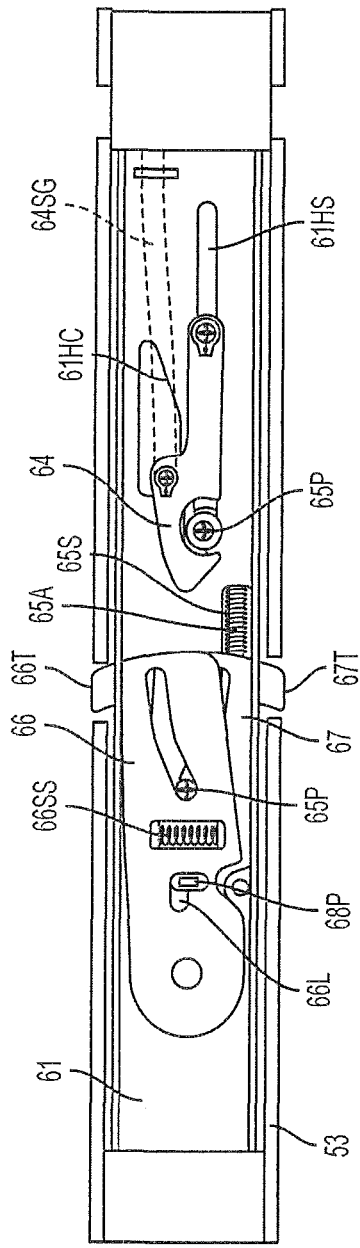
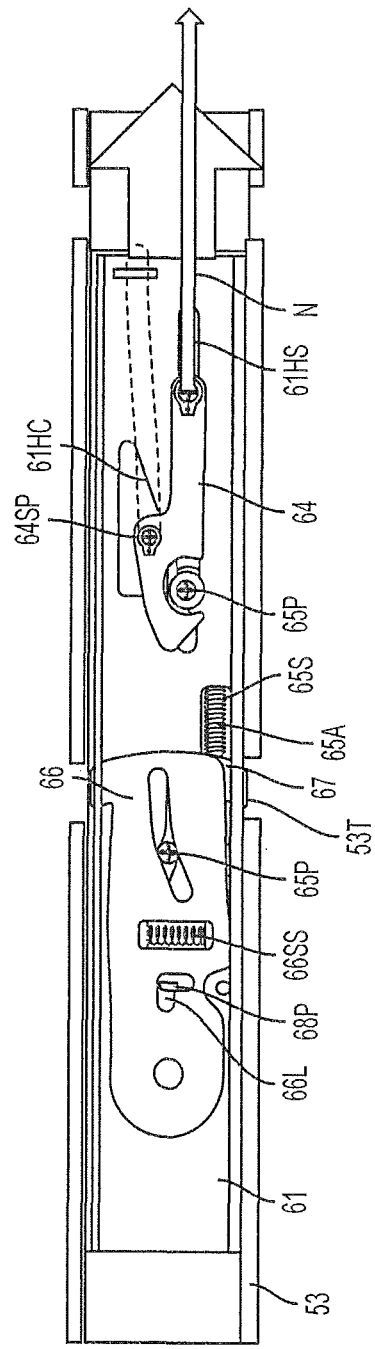
FIG. 7A
FIG. 7B

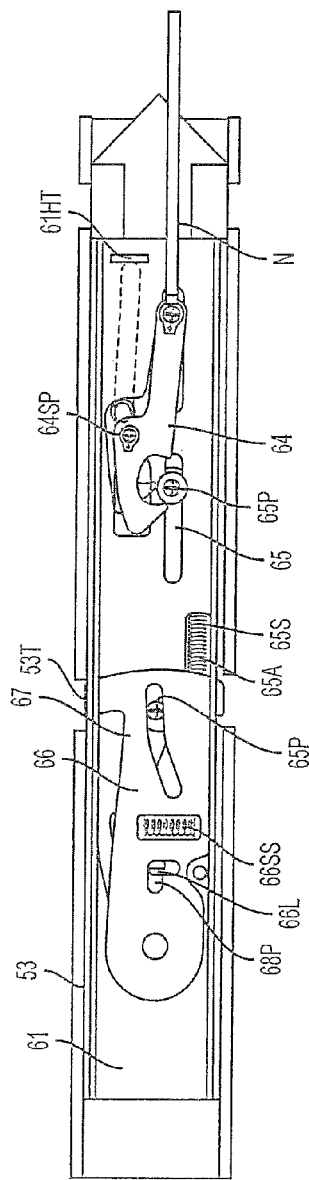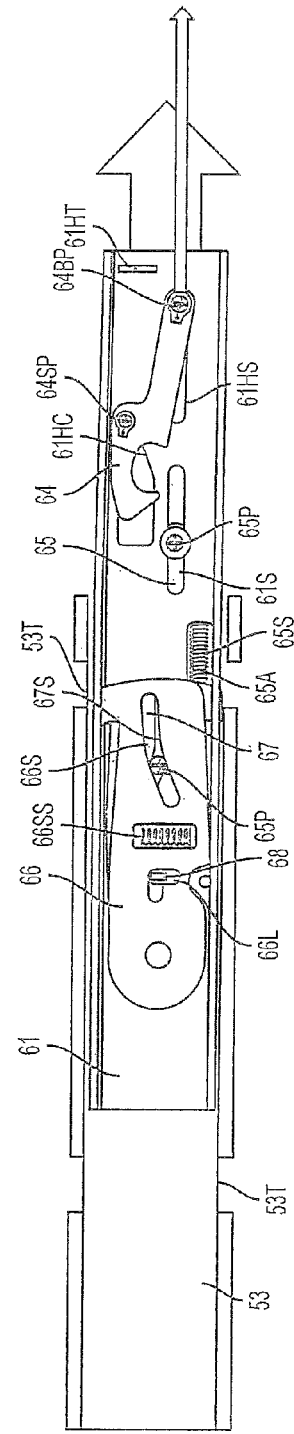
FIG. 7C
FIG. 7D

PORTABLE WORK BENCH

CROSS-REFERENCE TO RELATED APPLICATION

The following application derives priority from U.S. patent application No. 62/044,705, filed on Sep. 2, 2014, now pending, which is hereby incorporated in whole by reference.

FIELD

This invention relates generally to work benches and more particularly to a portable work bench that can support a power tool.

BACKGROUND

It is common in the construction industry for users to bring their power tools to the work site. Thus, the users require a work surface at the work site to support the power tools for use. Preferably the work surface is at a certain height so that the user can comfortably use the power tool. In addition, the work surface should also be sufficiently portable to be easily moved around a work site.

In the past, users have disposed their power tools on sheets of wood which are in turn supported by two or more sawhorses. This arrangement, however, lacks the strength and stability for efficient operation, as well as being difficult to set up and move around the work site.

Portable work benches, such as the devices disclosed in U.S. Pat. Nos. 6,658,966, 7,048,021, and 7,481,254, and US Patent Publication No. 2008/0196632, which are all hereby incorporated by reference, have proposed different foldable work benches that can be transported to different jobsites. However, these work benches require the user to either lift the power tool to dispose it on the work bench, or lift the power tool disposed on the work bench in order to set up the work bench in the operating position.

SUMMARY

In accordance with the present invention, an improved portable work bench is employed. The work bench may include a body for supporting a power tool, a first leg connected to a first end of the body, a second leg connected to a second end of the body, the first and second legs being pivotally connected, the first and second legs being movable between a first position where the body is in a lowered position and a second position where the body is in an elevated position, and a spring connecting the first and second legs so that the spring provides at least a portion of the force necessary to move the first and second legs from the first position to the second position.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIGS. 2A-2B show the work bench in an expanded mode and a retracted mode, respectively, and FIG. 2C shows the work bench in a retracted vertical orientation;

FIGS. 6A-6B are a top perspective view and an exploded perspective view, respectively, and FIGS. 6C-6D are bottom plan views in two different positions, respectively; and FIG. 7A-7E illustrate the interaction between the lifting mechanism of FIG. 5 and the locking mechanism of FIGS. 6A-6D as the work bench is moved from a retracted position towards an expanded position, where FIGS. 7A-7E are partial cross-sectional views in five different travel positions, respectively.

DETAILED DESCRIPTION

Figure 1:
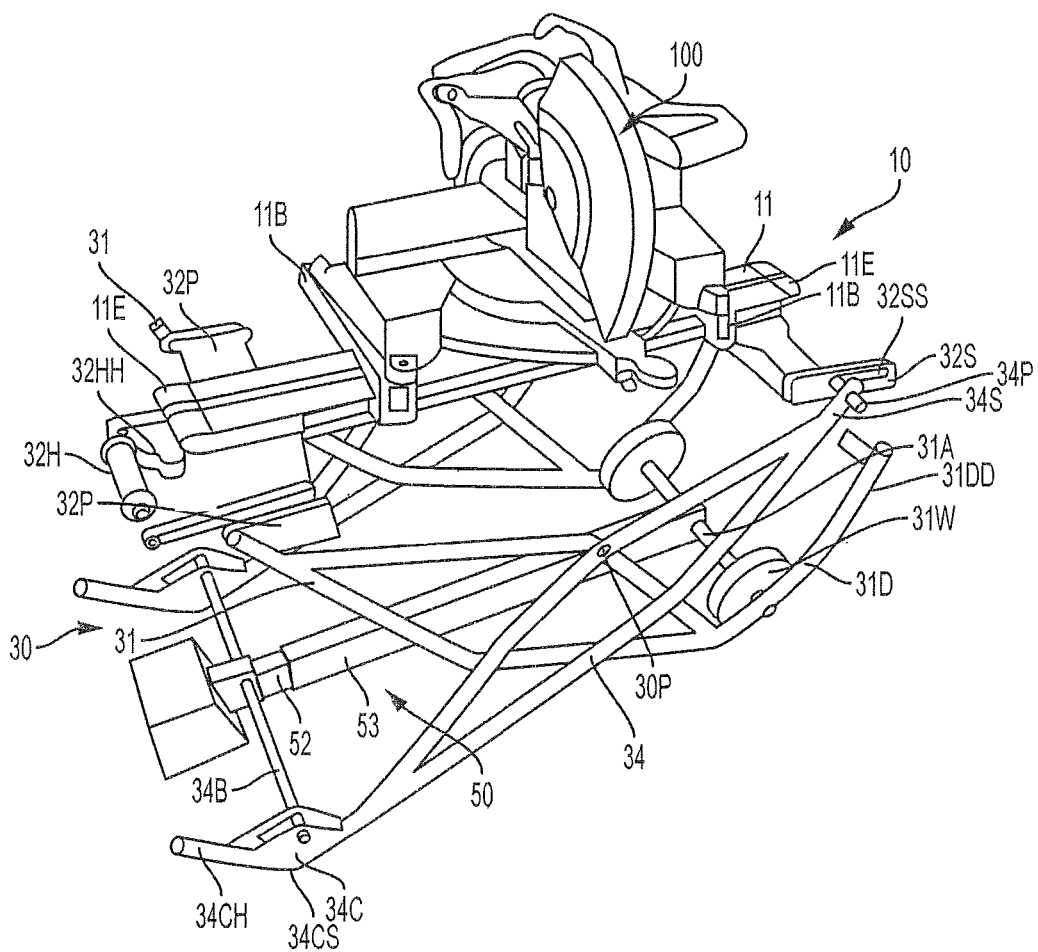
FIG. 1 is a front perspective view of a portable work bench of the present invention.

The invention is now described with reference to the accompanying figures, wherein like numerals designate like parts. Referring to FIG. 1, a portable work bench 10 of the present invention is designed to carry a power tool 100, such as a table saw, chop saw or miter saw, and/or a workpiece (not shown). However, persons skilled in the art will recognize that the work bench 10 can support any power tool, such as a sliding compound miter saw, a drill press, etc., any hand tools, or anything else that may need to be supported.

The work bench 10 has a structural body 11 for supporting power tool 100. Preferably structural body 11 is elongated and tubular, and may have a thin wall which substantially defines the outer perimeter thereof. Such body 11 can withstand substantial amounts of torsional and lateral loads applied thereto. Body 11 can be made of extruded aluminum, bent metal, fabricated sheet metal, etc. An embodiment of body 11 can be found in U.S. Pat. No. 7,036,540, which is hereby fully incorporated by reference. Alternatively, body 11 may be a tube (or multiple tubes) preferably shaped as a closed loop.

Power tool 100 can be mounted directly unto structural body 11. Alternatively, power tool 100 can be mounted on at least one mounting bracket 11B, which is then disposed on structural body 11.

Structural body 11 may also support extensions 11E that are received within body 11 to extend the effective length of body 11 and/or support accessories (not shown) that can contact the workpiece. Such extensions 11E are disclosed in U.S. Publication No. 2009/0151816, which is fully incorporated herein by reference.

In addition, the work bench 10 may have leg assemblies 30 for supporting the structural body 11 (and thus the power tool 100 and/or workpiece). Referring to FIGS. 1-2, the leg assemblies 30 may include at least one leg 31 pivotally connected to the body 11 via brackets 32P at one end of body 11. The other end 31D of leg(s) 31 may support at least one wheel 31W that contact the ground and preferably continue in an upwardly orientation to define a surface 31DD. Preferably the surface 31DD will define a plane along with wheel(s) 31W, so that the work bench 10 may be disposed in a vertical orientation as shown in FIG. 2C. Wheels 31W are preferably disposed on a common axle 31A that extends through end 31D.

Preferably, leg 31 is made of metal, such as extruded aluminum or welded tubes. The cross-section of leg 31 may be round or ob-round (with two opposing substantially flat sides).

Leg assemblies 30 may also include at least one leg 34 slidingly connected to the body 11 via brackets 32S at one end of body 11. Leg(s) 34 may have an end 34S with a protrusion or rod 34P that preferably slides along a slot 32SS of bracket 32S.

The other end 34C of leg(s) 34 may provide a contact surface 34CS for contacting the ground. In addition, end(s) 34C may also have a handle portion 34CH that can be used as handles for moving the work bench 10 when being moved around in the vertical orientation of FIG. 2C. It may be desirable to provide a beam 34B connecting both ends 34C to increase the overall rigidity of work bench 10. Persons skilled in the art shall recognize that, alternatively, ends 31D could support the contact surface 34CS and handles 34CH, While ends 34C can support one wheel 31W and have surface 31DD.

Leg(s) 34 may be made of metal, such as extruded aluminum or welded tubes. The cross-section of leg(s) 34 may be round or ob-round (with two opposing substantially flat sides).

Preferably each leg 31 is pivotably connected to a corresponding leg 34 at pivot point 30P. Such arrangement allows each leg 31, 34 to be rotated between a retracted position (such as that shown in FIG. 2B) and an expanded position (such as that shown in FIG. 2A). With such arrangement, the work bench 10 can be very compact height-wise in the retracted position, while still providing an ergonomic-usable height of body 11 in the expanded position.

Figure 2A:
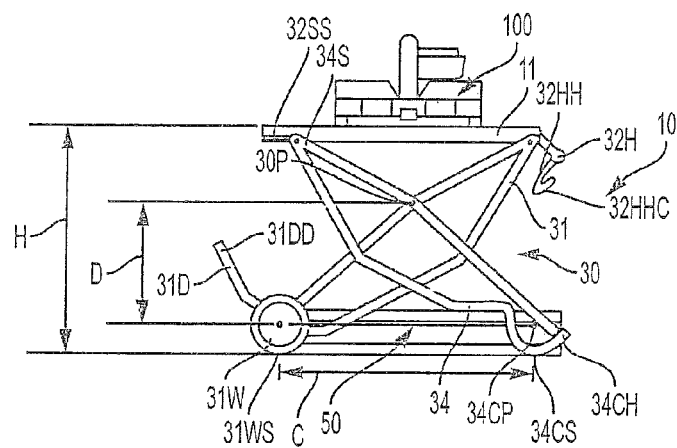
FIGS. 2A-C are simplified rear views of the work bench of FIG. 1, where

In particular, for a work bench 10 where the height H between the ground and the top of body 11 is about 32.5 inches (about 82.6 cm) when in the expanded position of FIG. 2A, the height distance D between pivot 30P and the axis of wheel 31W is about 17.5 inches (about 44.5 cm) when the work bench 10 is in the expanded position of FIG. 2A, and the distance C between the axis of wheel 31W and a point 34CP above surface 34CS is about 37 inches (about 94 cm). Persons skilled in the art may recognize that distance C may be defined as the distance between the surface 31WS of wheel 31W contacting the ground and the surface 34CS contacting the ground.

Figure 2B:
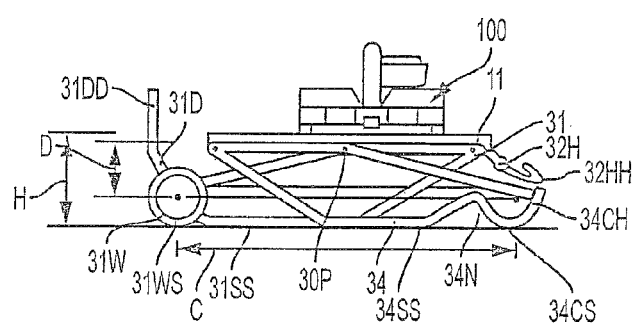
Figure 2C:
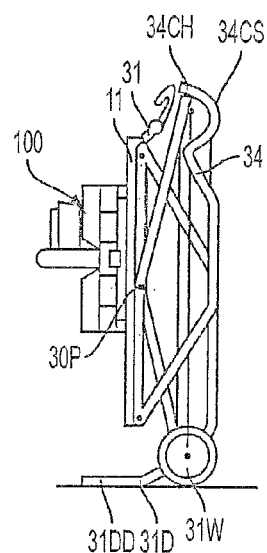

When the work bench is in the retracted position of FIG. 2B, the height H between the ground and the top of body 11 is preferably about 13 inches (about 33 cm). The height distance D between pivot 30P and the axis of wheel 31W is preferably about 7 inches (about 17.8 cm), and the distance C between the axis of wheel 31W and a point 34CP above surface 34CS is about 48.7 inches (about 123.7 cm). Persons skilled in the art may recognize that distance C may be defined as the horizontal distance between the surface 31WS (which may or may not contact the ground) and the surface 34CS contacting the ground.

Persons skilled in the art will recognize that legs 31, 34 can be designed for additional features that facilitate transportation of the work bench 10. For example, legs 31, 34 could have surfaces 31SS, 34SS, respectively, that are substantially coplanar with each other so that the retracted work bench 10 can slide along surfaces 31SS, 34SS when work bench 10 is disposed on the ground in the retracted position of FIG. 2B. Preferably surface 31WS of wheel 31W is also substantially coplanar with surfaces 31SS, 34SS, or slightly higher than surfaces 31SS, 34SS. Surfaces 31SS, 34SS could be separate pads disposed on legs 31, 34 made of a low friction material to enhance the sliding characteristics of surfaces 31SS, 34SS. Persons skilled in the art shall recognize that it is preferable to not have any portion of work bench 10 below the plane defined by surfaces 31SS, 34SS.

Figure 3:
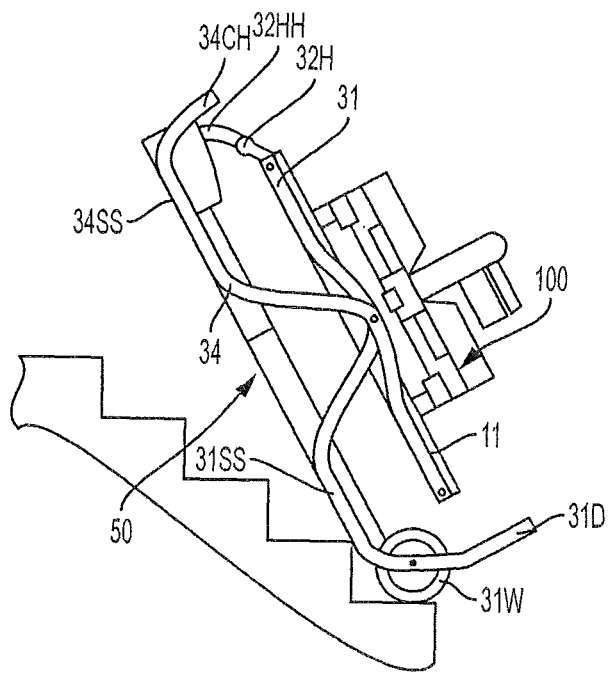
FIG. 3 illustrates a method of transporting the work bench up a flight of stairs.

Such arrangement could facilitate moving work bench 10 along a staircase as shown in FIG. 3. In particular, surfaces 31SS can contact and slide along the nosing of the steps when the user is moving work bench 10 up the stairs. The user can also dispose the surfaces 31SS, 34SS on the nosing of the steps and slide work bench 10 along the nosings to move work bench 10 up or down the stairs.

Figure 4:
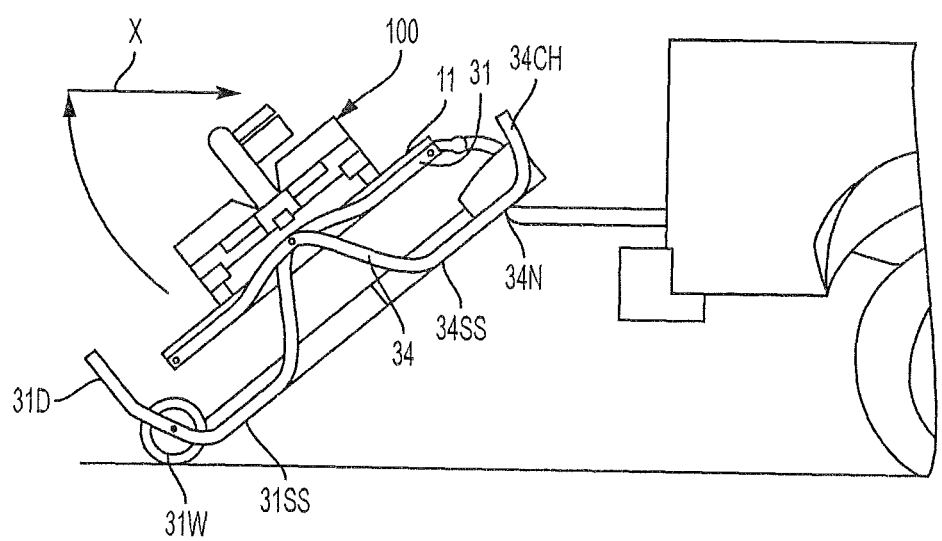
FIG. 4 illustrates a method of loading the work bench unto a vehicle.
Figure 5:
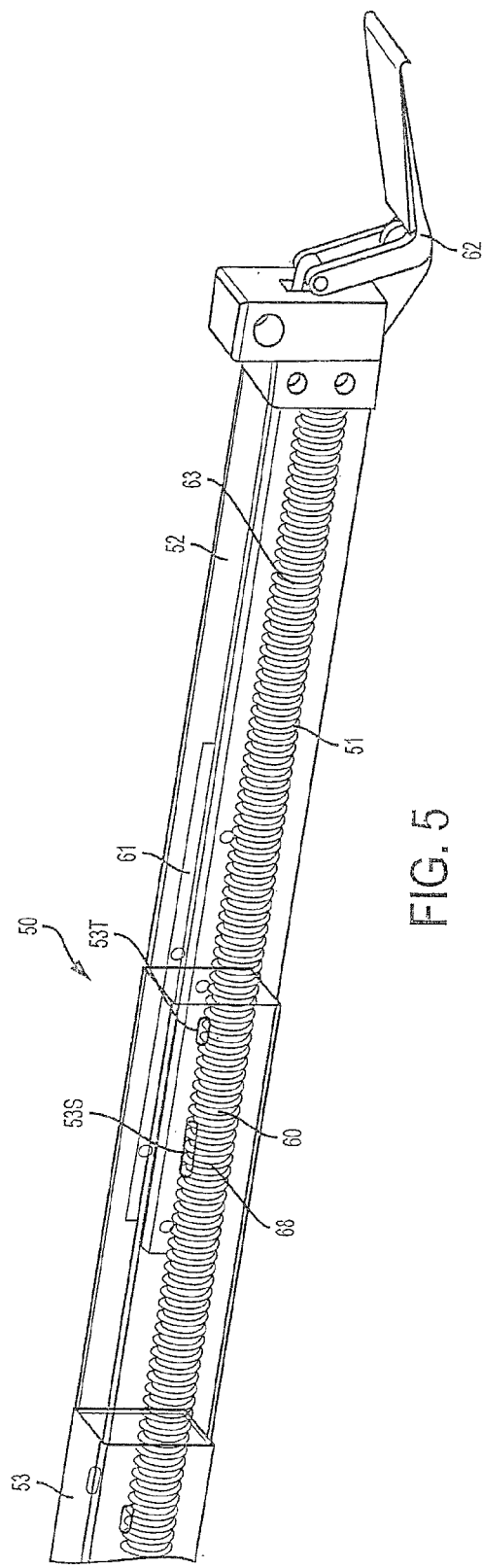
FIG. 5 shows a perspective view of a work bench lifting mechanism.

It is preferable to provide a negative feature or notch 34N on leg(s) 34 that can be engaged with the tailgate of a pick-up truck as shown in FIG. 4. Such feature 34N can be a small notch (as shown in FIG. 4) or a larger curve in leg 34 (as shown in FIG. 2B). With such arrangement, the user can grab end 31D to lift work bench 10 and pivot about notch 34N, then push work bench into the bed of the truck along direction X. Persons skilled in the art will recognize that work bench 10 will first slide along surfaces 34SS, and then on both surfaces 31SS, 34SS as work bench 10 moves further into the bed of the truck.

It may be desirable to provide a handle 32H on bracket 32P. Such handle 32H can provide another area for the user to grasp when moving around work bench 10, thus facilitating transportation thereof. Handle 32H may also be used to move work bench from the retracted position of FIG. 2B to the expanded position of FIG. 2A.

Persons skilled in the art will recognize that it is preferable to provide a mechanism for maintaining work bench 10 in the retracted position of FIG. 2B. Such mechanism can include a hook latch 32HH connected at one end to bracket 32P and at the other end to beam 34B. Preferably hook latch 32HH is connected to a torsion spring (not shown) that biases the hook latch 32HH into an engagement position with bracket 32P or beam 34B.

Hook latch 32HH may have a cam surface 32HHC which will move hook latch 32HH when first contacting the bracket 32P or beam 34B until a certain position is achieved. At such position, the torsion spring will force the rotation of hook latch 32HH into a position where bracket 32P or beam 34B is captured. Hook latch 32HH may also be connected to handle 32H so the user can unlatch hook latch 32HH by rotating handle 32H about its axis.

It is desirable to provide a lifting mechanism 50 that can facilitate the movement from the retracted position of FIG. 2C to the expanded position of FIG. 2B. Referring to FIGS. 1-5, lifting mechanism 50 may include a spring 51 connected at one end to an inner tube 52, which in turn is connected to beam 34B. Persons skilled in the art will recognize that spring 51 may be directly connected to beam 34B.

Spring 51 may be connected at its other end to an outer tube 53, which may receive inner tube 52 in a telescoping matter. Outer tube 53 may in turn be connected to axle 31A or leg 31. Persons skilled in the art will recognize that spring 51 may be directly connected to axle 31A or leg 31.

Persons skilled in the art will recognize that the strength of the spring 51 can be selected to determine how much spring 51 will assist in moving work bench 10 from the retracted position of FIG. 2B to the expanded position of FIG. 2A. In the retracted position of FIG. 2B, spring 51 may be stretched to about 35 inches (about 88.9 cm), exerting a force of approximately 97.7 pounds (about 434.6 newtons). Because the distance from spring 31 to pivot 30P is about eight inches (about 20.3 cm) in the retracted position of FIG. 2B, the spring 51 is preferably creating a moment of approximately 780 in-Lbf.

In the expanded position of FIG. 2A, spring 51 may be stretched to about 25.5 inches (about 64.8 cm), exerting a force of approximately 32.4 pounds (about 144.1 newtons). Because the distance from spring 51 to pivot 30P is about 16.5 inches (about 41.9 cm) in the expanded position of FIGS. 2A, the spring 51 is preferably creating a moment of approximately 535.6 in-Lbf.

Referring to FIGS. 5-8, a locking mechanism 60 may be provided to interact with inner and outer tubes 52, 53. Locking mechanism 60 may include a housing 61 disposed within inner and/or outer tubes 52, 53. Preferably housing 61 is connected to inner tube 52.

Locking mechanism 60 may also include a latch handle 62 preferably pivotably connected to inner tube 52, a link 63 connected to latch handle 62, and a hook 64 connected to link 63.

Hook 64 may be connected to link 63 via a post 64BP. Post 64BP may slide along a slot 61HS on housing 61.

Hook 64 may be latchable unto a connecting rod 65. Hook 64 may be biased towards a latching position by a spring 64S. Preferably, a spring guide 64SG is pivotally connected to hook 64 via post 64SP. Spring 64S may be trapped between a wall of spring guide 64SG and a tab 61HT of housing 61. Persons skilled in the art will recognize that spring guide 64SG will preferably slide through tab 61HT as the position of hook 64 changes. Post 64SP (and thus hook 64) preferably slides along cam surface 61HC of housing 61.

Connecting rod 65 may have two posts 65P captured within slots 61S of housing 61. At least one of the posts 65P may have a bushing 65B. Connecting rod 65 may also have an arm 65A for capturing a spring 65S between a portion of arm 65A and a tab 61RT on housing 61. Persons skilled in the art will recognize such arrangement biases connecting rod 65 away from tabs 61RT (and thus away from tab 61HT).

Connecting rod 65 may engage at least one locking plate 66. Preferably connecting rod 65 engages top and bottom locking plates 66, 67. Preferably one of the posts 65P rides along slots 66S, 67S of corresponding top and bottom locking plates 66, 67. Top and bottom locking plates 66, 67 are preferably pivotally attached to housing 61.

Locking plates 66, 67 have corresponding locking tabs 66T, 67T that can exit housing 61 via slots 61L. A spring 66SS preferably biases the top and bottom locking plates 66, 67 outwardly relative to housing 61 so that locking tabs 66T, 67T that can exit housing 61 via slots 61L. Locking tabs 66T, 67T can engage locking slots 53T on outer tube 53.

A trigger 68 may be disposed under housing 61. Preferably trigger 68 is pivotally attached to housing 61. Trigger 68 may have a protrusion 68P that extends through housing 61 and through L-shaped slots 66L, 67L disposed on top and bottom locking plates 66, 67. A spring 68S biases trigger 68 (and protrusion 68P) into contact with the L-shaped slots 66L, 67L. In a rotated position, trigger 68 may have a portion extending through slot 53S of outer tube 53.

Figure 6A:
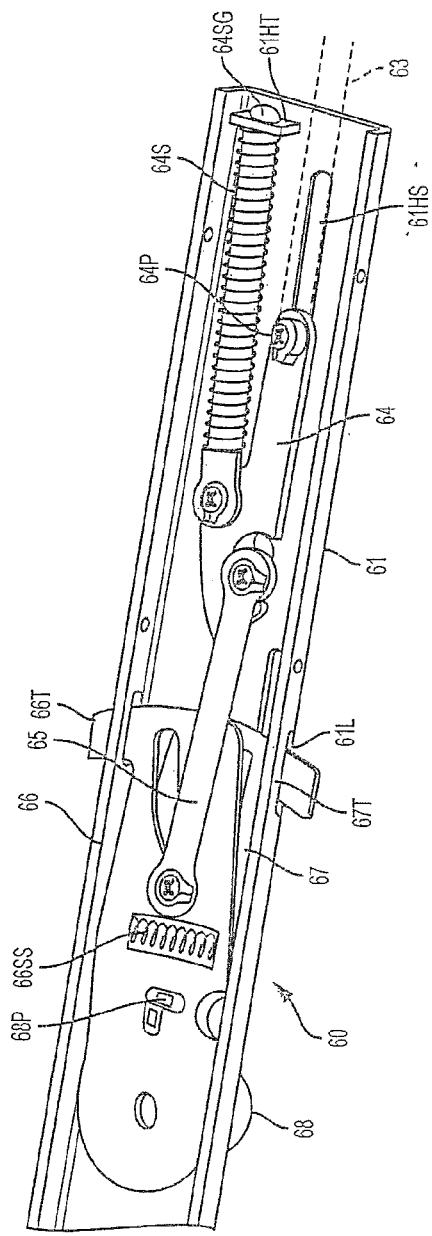
FIG. 6A-6D illustrate a locking mechanism, where
Figure 6B:
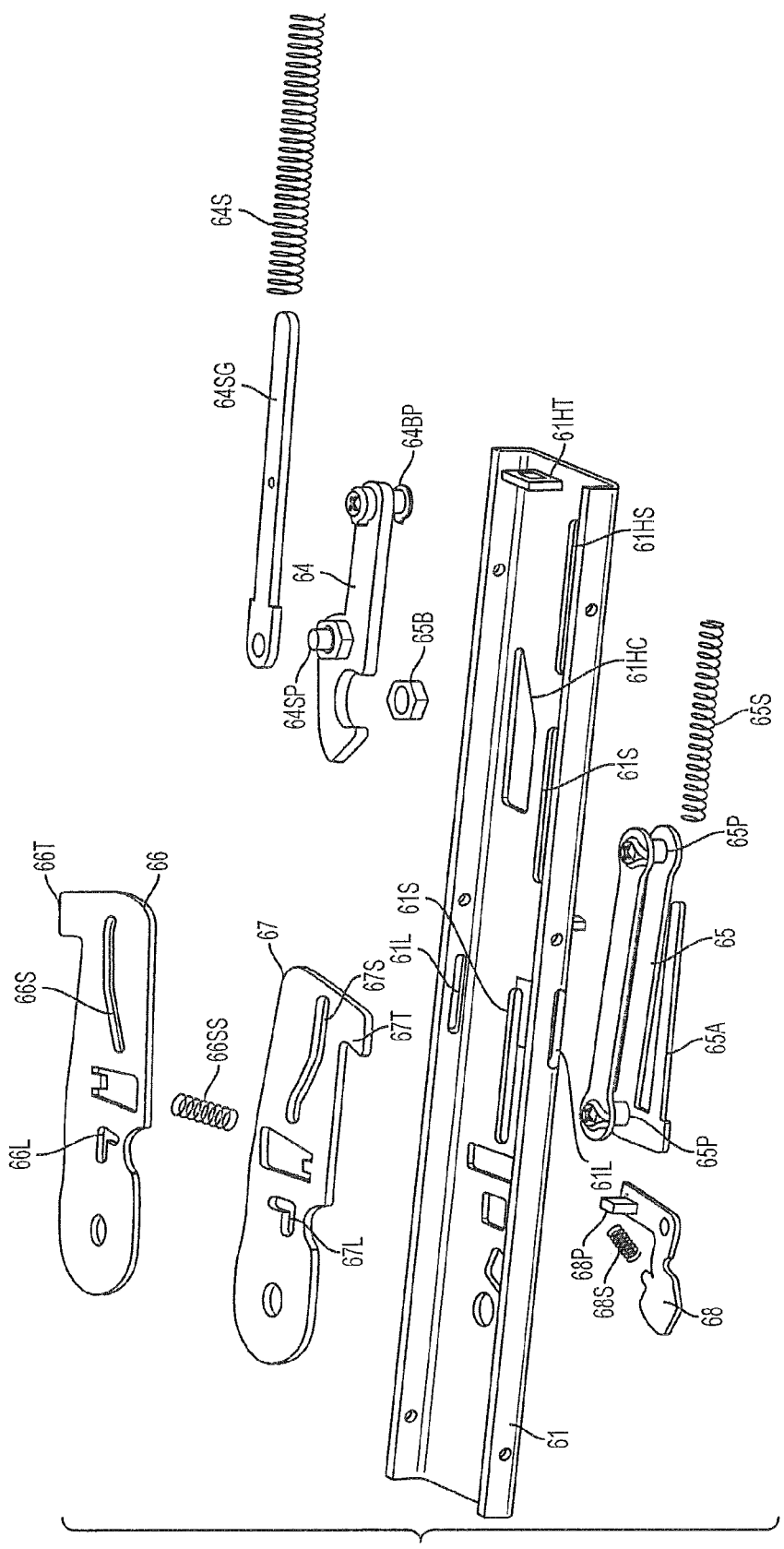
Figure 6C:
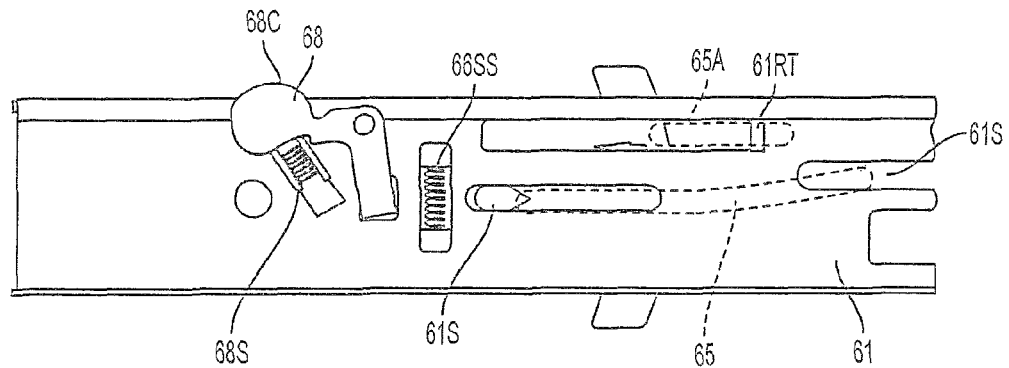

Referring to FIGS. 6C and 7A, locking tabs 66T, 67T are engaged to slots 53T of outer tube 53, thus fixing the position of inner tube 52 relative to outer tube 53. When the user steps on latch handle 62, link 63 pulls hook 64 in the direction N (shown in FIG. 7B). Because hook 64 pulls on post 65P, connecting rod 65 moves the other post 65P along slots 66S, 67S. Such motion causes locking plates 66, 67 to pivot towards each other, retracting locking tabs 66T, 67T from engagement with locking slots 53T (as shown in FIG. 7C).

Figure 6D:
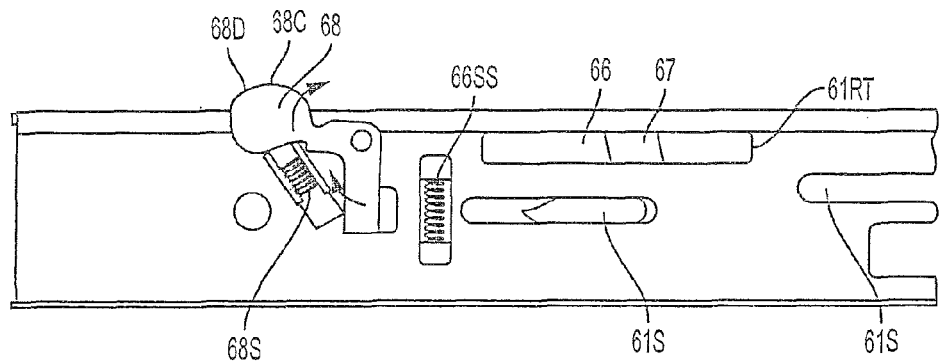

As the locking plates 66, 67 pivot toward each other, the L-shaped slots 66L, 67L align. Such alignment provides the clearance necessary for spring 68S to pivot trigger 68 (and thus protrusion 68P) as shown in FIGS. 6D and 7C. With such movement, protrusion 68P moves along L-shaped slots 66L, 67L in a locking position that maintains locking plates 66, 67 in the pivoted position.

As hook 64 continues to be pulled along direction N, post 64SP moves along cam surface 61HC, causing hook 64 to move out of engagement with post 65P. When hook 64 completely disengages with post 65P, the spring 65S biases connecting rod 65 (and thus posts 65P) in a direction opposite to direction N (as shown in FIG. 7D). Persons skilled in the art will recognize that post 65P cannot move along slots 66S, 67S because protrusion 68P is preventing the locking plates 66, 67 from pivoting back to the position shown in FIG. 7A.

While locking tabs 66T, 67T are disengaged from slots 53T, spring 51 is able to move inner tube 52 (and housing 61) into outer tube 53, decreasing the distance C and thus moving work bench 10 from the retracted position of FIG. 2B to the expanded position of FIG. 2A. As housing 61 moves relative to outer tube 53, trigger 68 moves out of slot 53S and slides along outer tube 53. A cam surface 68C contacts outer tube 53 and forces trigger 68 to pivot, moving protrusion 68P out of engagement with L-shaped slots 66L, 67L (see FIG. 7D).

Figure 7E:
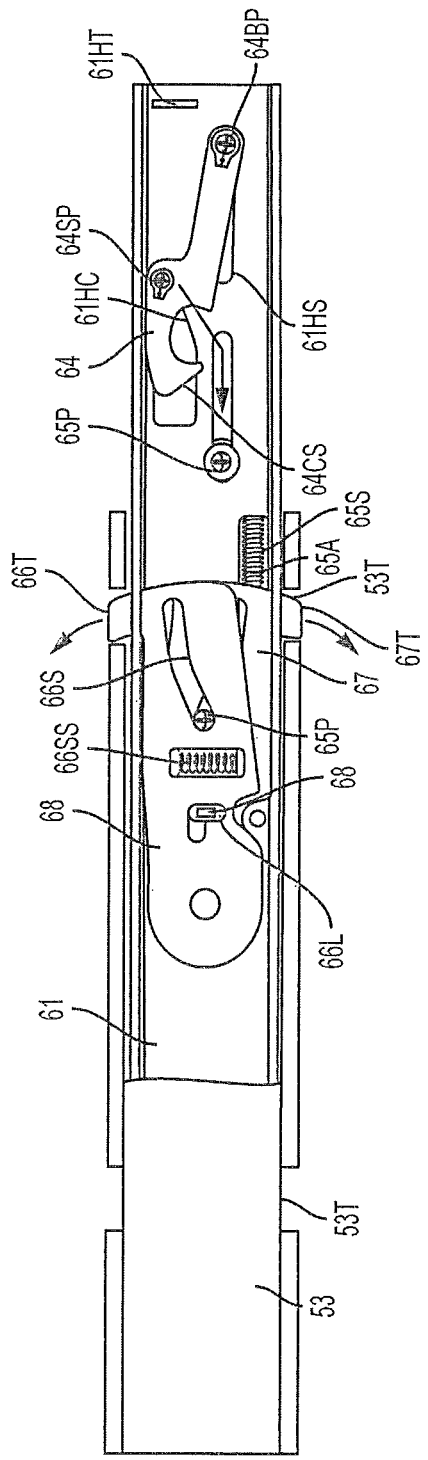

Because protrusion 68P no longer prevents the locking plates 66, 67 from pivoting back to the position shown in FIG. 7A, locking tabs 66T, 67T can snap into engagement with the next locking slots 53T at the next locking position as inner tube 52 moves relative to outer tube 53 (see FIG. 7E). Such snap action preferably occurs because of the stored energy of spring 66SS as well as by post 65P moving along slots 66S, 67S due to the action of spring 65S.

When the user releases the latch handle 62, spring 64S will move hook 64 towards locking plates 66, 67. A cam surface 64CS preferably will contact post 65P and move hook 64 past post 65P back to the latching position shown in FIG. 7A.

Persons skilled in the art will recognize that FIGS. 7A-7E show the movement of outer tube 53 and inner tube 52 as work bench 10 is moved from the retracted position of FIG. 2B to the expanded position of FIG. 2A. In order for work bench 10 to move from the extended position of FIG. 2A to the retracted position of FIG. 2B, the user would move latch handle 62, so that link 63 pulls hook 64 in the direction N (shown in FIG. 7B). As before, connecting rod 65 moves the other post 65P along slots 66S, 67S, causing locking plates 66, 67 to pivot towards each other, retracting locking tabs 66T, 67T from engagement with locking slots 53T (as shown in FIG. 7C).

As the locking plates 66, 67 pivot toward each other, the L-shaped slots 66L, 67L align, allowing trigger 68 (and thus protrusion 68P) to pivot, maintaining the locking plates 66, 67 in the pivoted position.

In such position, inner tube 52 and outer tube 53 can move relative to each other, allowing the work bench 10 to move to the retracted position of FIG. 2B. As such motion happens, cam surface 68D on trigger 68 contacts outer tube 53 and forces trigger 68 to pivot, moving protrusion 68P out of engagement with L-shaped slots 66L, 67L (see FIG. 7D). Because protrusion 68P no longer prevents the locking plates 66, 67 from pivoting back to the position shown in FIG. 7A, locking tabs 66T, 67T can snap into engagement with the next locking slots 53T at the next locking position as inner tube 52 moves relative to outer tube 53 (see FIG. 7E).

When the user releases the latch handle 62, spring 64S will move hook 64 towards locking plates 66, 67. Cam surface 64CS preferably will contact post 65P and move hook 64 past post 65P back to the latching position shown in FIG. 7A.

Persons skilled in the art may recognize other additions or alternatives to the means disclosed herein. However, all these additions and/or alterations are considered to be equivalents of the present invention.

What is claimed is:

1. A work bench comprising:
a body for supporting a power tool,
a first leg connected to a first end of the body,
a second leg connected to a second end of the body, the first and second legs being pivotally connected to each other so the first and second legs can pivot relative to each other about a pivot point, the first and second legs being movable between a first position where the body is in a lowered position and a second position where the body is in an elevated position, and
a spring connecting the first and second legs so that the spring provides at least a portion of the force necessary to move the first and second legs from the first position to the second position, wherein the spring is connected to the first leg at a first point below the pivot point, and the spring is connected to the second leg at a second point below the pivot point,
a locking mechanism for maintaining the work bench in at least one of the first and second positions,
an inner tube connected to the first leg, and
an outer tube connected to the second leg, the outer tube sliding relative to the inner tube,
wherein the locking mechanism comprises a housing between the inner tube and the outer tube, and a locking plate disposed within the housing, the locking plate being movable between a first position not engage the outer tube and a second position engaging the outer tube.

2. The work bench of claim 1, wherein at least one of the first and second legs has a wheel attached thereto.

3. The work bench of claim 2, wherein the at least one of the first and second legs has a free-standing end that extends upwardly.

4. The work bench of claim 2, wherein the wheel is disposed on an axle, and the spring is connected at one end to the axle.

5. The work bench of claim 1, wherein the first and second legs have substantially coplanar surfaces for contacting ground when in the first position.

6. The work bench of claim 1, wherein the locking mechanism comprises a latch connected to the body.

\* \* \* \* \*